Aug. 24, 1965               H. SCHLEIN               3,202,804
METHOD AND APPARATUS FOR MONITORING
THE OPERATION OF A SYSTEM

Filed Aug. 31, 1961                                  9 Sheets-Sheet 1

*INVENTOR.*
HELMAR SCHLEIN

BY

ATTORNEY

INVENTOR.
HELMAR SCHLEIN
BY
ATTORNEY

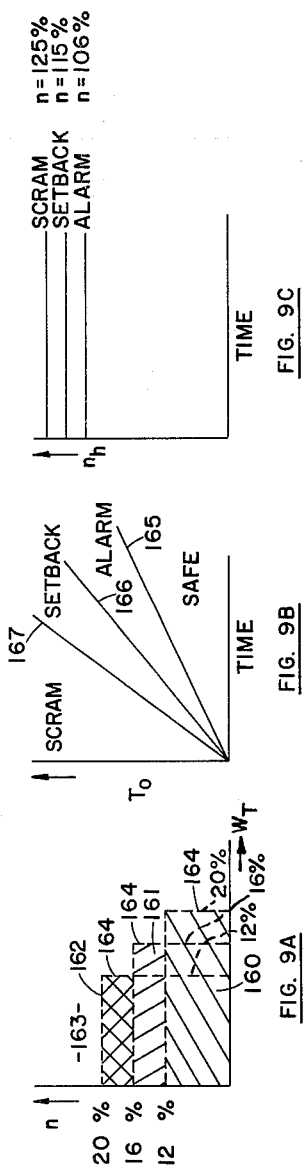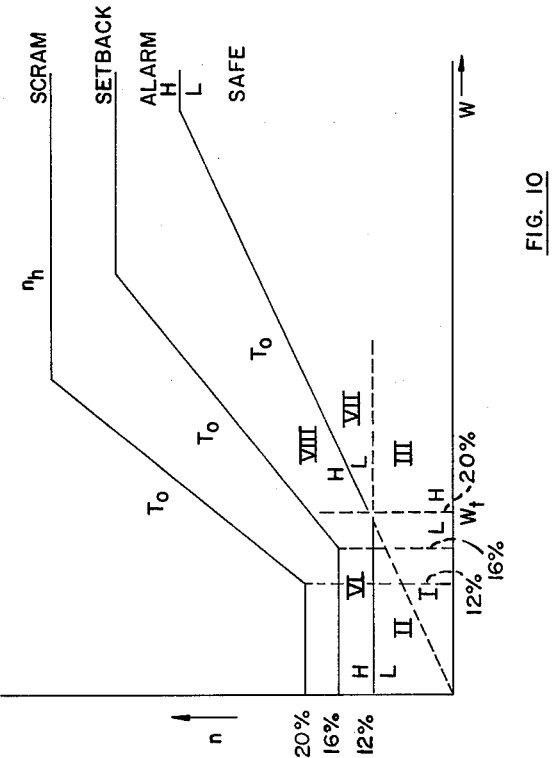

INVENTOR.
HELMAR SCHLEIN
BY
ATTORNEY

United States Patent Office 3,202,804
Patented Aug. 24, 1965

3,202,804
METHOD AND APPARATUS FOR MONITORING THE OPERATION OF A SYSTEM
Helmar Schlein, Reseda, Calif., assignor to North American Aviation, Inc.
Filed Aug. 31, 1961, Ser. No. 135,344
12 Claims. (Cl. 235—151)

The present invention is directed to a method and apparatus for monitoring the operation of a system and more particularly a method and apparatus for monitoring the value of a plurality of conditions and determining whether these conditions define an unacceptable operating state.

Specifically, the present invention relates to a method and apparatus for monitoring a plurality of variable conditions within a system which is particularly suited for use as a safety monitoring system for a nuclear power reactor. The control systems generally used in prior art power reactors have been concerned primarily with the individual control of each variable in the reactor. Thus, neutron flux monitoring and control has been generally considered independently of temperature and coolant flow, as in U.S. Patents 2,927,070 and 2,931,763, although actually related in reactor operation. Other prior art control systems utilize temperature and flow as control parameters but only for steady-state operation (see Nucleonics, vol. 16, No. 5, May 1958, pages 61–79).

The present invention has the primary object of providing an automatic data interpreting system which compares incoming information defining the operation of a system to be monitored with what the information should be for a particular operating circumstance and alarms or indicates corrective action when particular deviations are detected.

It is another object of the present invention to provide a method and apparatus for monitoring the operation of a system and determining when that operation has reached an unacceptable state.

It is a further object of the present invention to provide a method and apparatus for comparing the values of parameters defining the operation of a system with an acceptable norm and indicating the relationship of the parameters with respect to the norm.

It is a still further object of the present invention to provide a method and apparatus for automatically monitoring and controlling the operation of a nuclear power reactor system.

These and other objects and advantages of the present invention will be more apparent from the following description and drawings, made a part hereof, in which.

Figure 8:
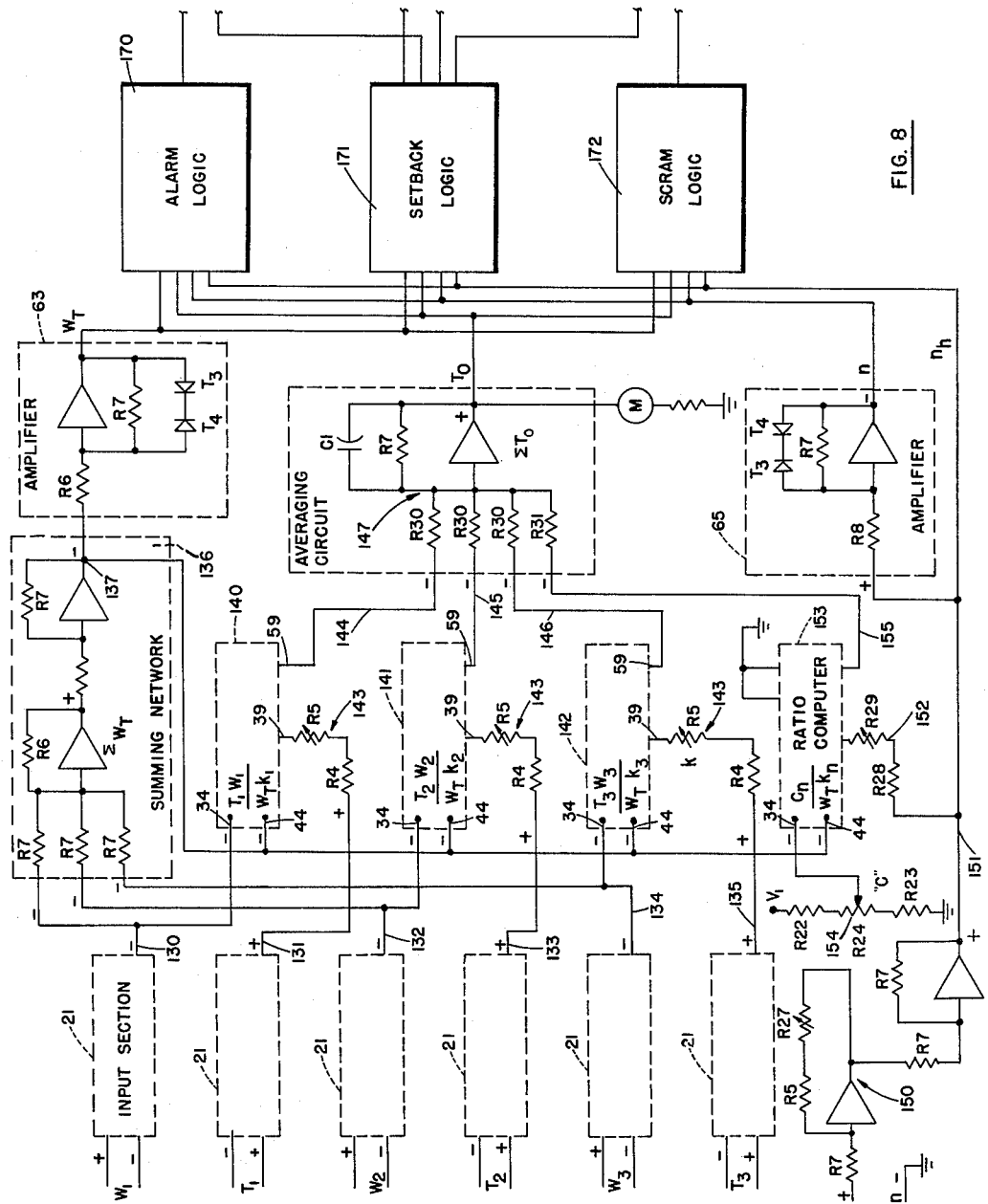
FIGS. 8 and 8A are a circuit diagram of a second embodiment of the present invention.
Figure 8A:
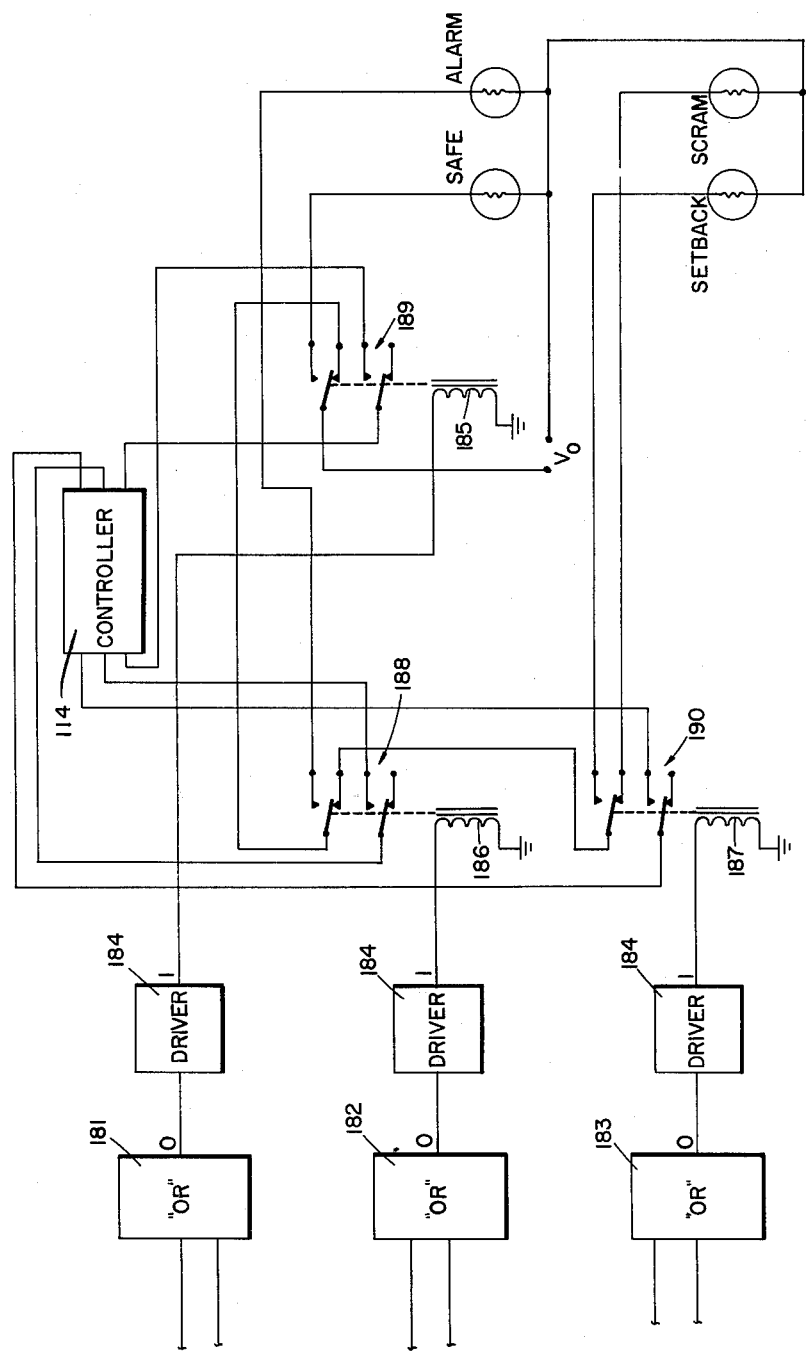
Figure 11:
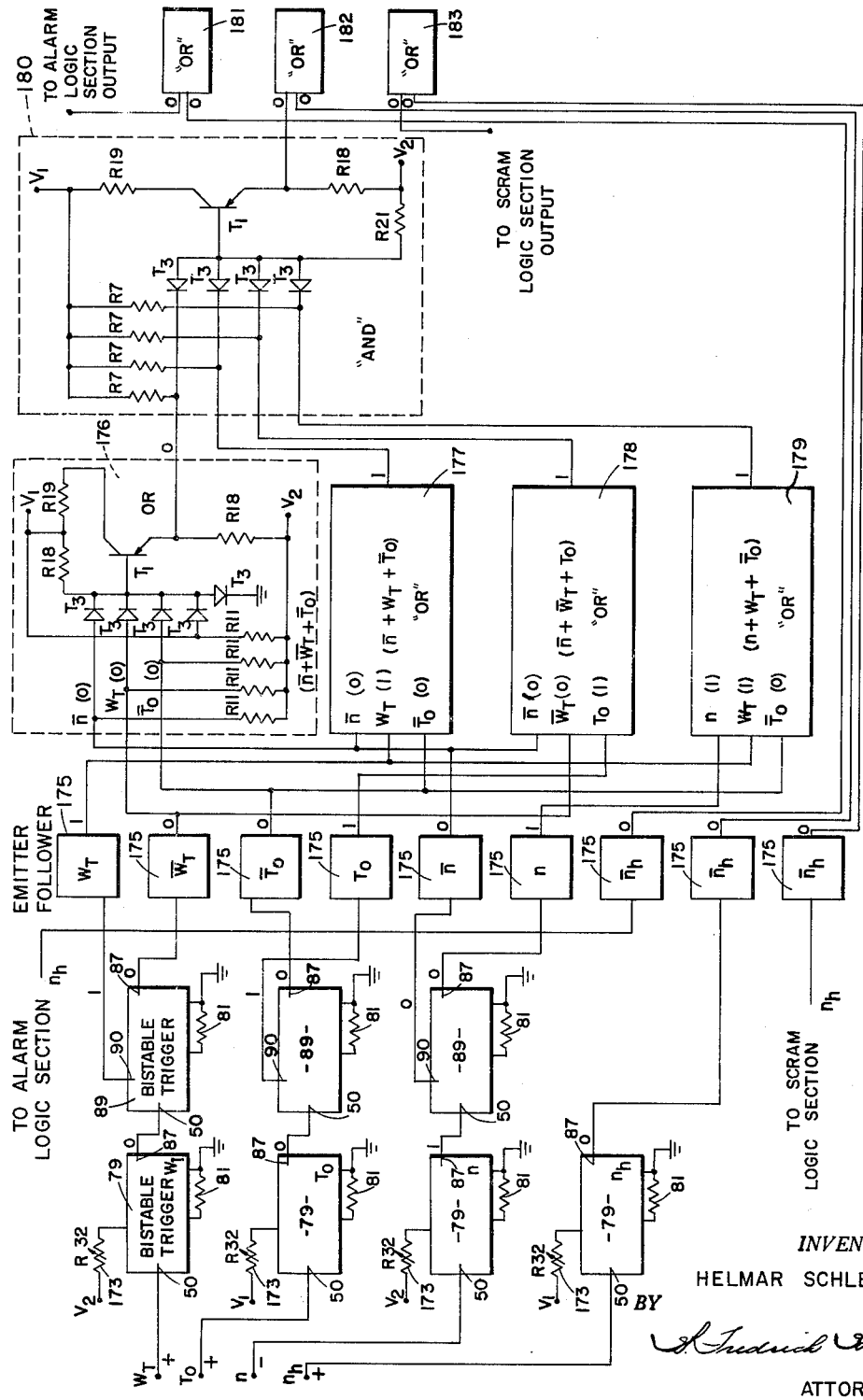

FIGS. 9A, 9B, and 9C are graphical representations of operating curves of the embodiment of FIG. 8;

FIG. 10 is a composite graphical representation of the truth table conditions for the embodiment of FIGS. 8 and 8A; and FIG. 11 is a circuit diagram of the logic section of FIGS. 8 and 8A.

Figure 1:
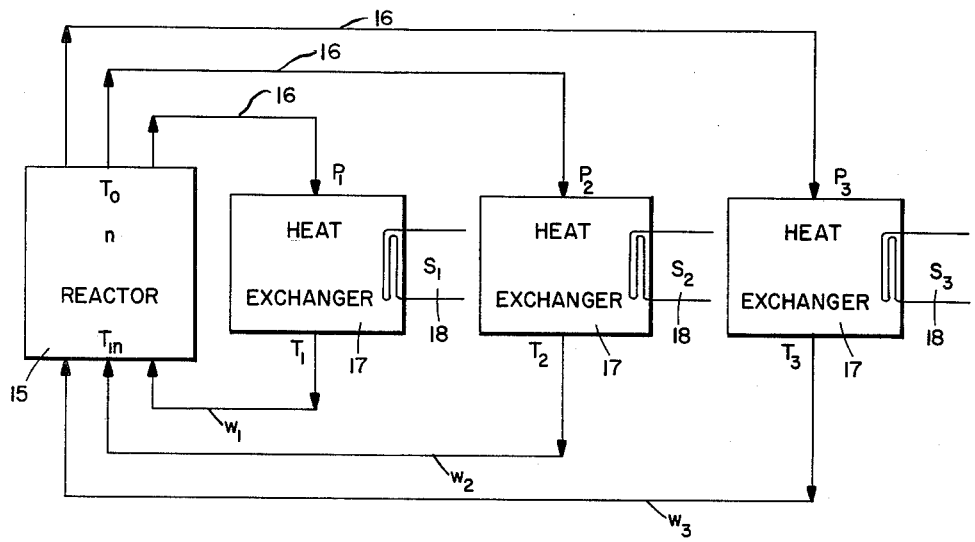
FIG. 1 is a schematic diagram of an exemplary system to be monitored.

The present invention is described as applied to a nuclear reactor power generating facility (see FIG. 1) in which the heat generated in the reactor core 15 is carried away by a coolant in three primary cooling loops 16. Each cooling loop contains an intermediate heat exchanger 17 where heat from the primary cooling loop is transferred to a secondary cooling loop 18. The three secondary loops are connected to a steam generator from which superheated steam is fed to a turbine-generator. The operator makes appropriate adjustments to the controls to obtain the desired coolant flow and temperature and thus power output and operating condition.

The preferred embodiments of the present invention have as their primary purpose to provide a monitoring and computer system to indicate abnormal operating conditions of the reactor and also to take corrective action, including shutting down the reactor, if variations from the preselected operating norm are of sufficient magnitude. All computers are supplied in groups of three using independent transducers. Off-normal conditions are indicated and corrective action taken when required by any two of the three identical units. If only two units are operating, the remaining two units of that group will act upon off-normal conditions on a one-out-of-two basis. Two computer systems are disclosed as embodiments of the present invention. The first embodiment, a flow/flow computer system, computes the ratio of primary to secondary coolant flow, i.e., P and S, and continuously compares the computed ratio with a preselected operating range. The second, a power/flow computer, computes the predicted reactor outlet temperature $T_0$ in terms of the core tank inlet temperatures $T_1$, $T_2$, and $T_3$, the primary coolant flow rates $W_1$, $W_2$, and $W_3$, the total coolant flow rate in the three primary coolant loops, $W_T$, and the core thermal power, which is proportional to the neutron flux $n$.

Figure 2:
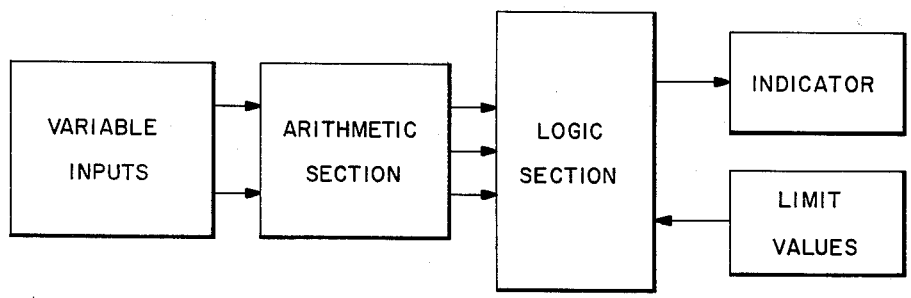
FIG. 2 is a schematic diagram of the monitoring system of the present invention.

Both embodiments of the present invention comprise basically (see FIG. 2) a plurality of inputs representative of system variables, an arithmetic section for computing additional variables which are functions of the input variables and amplifying the input signals, a logic circuit for determining whether one or more of the individual variables have exceeded one or more preselected limit values, and an output circuit responsive to the determination of the logic circuit for indicating the necessity for corrective action and/or operating an automatic control circuit.

FLOW/FLOW COMPUTER

Figure 3:
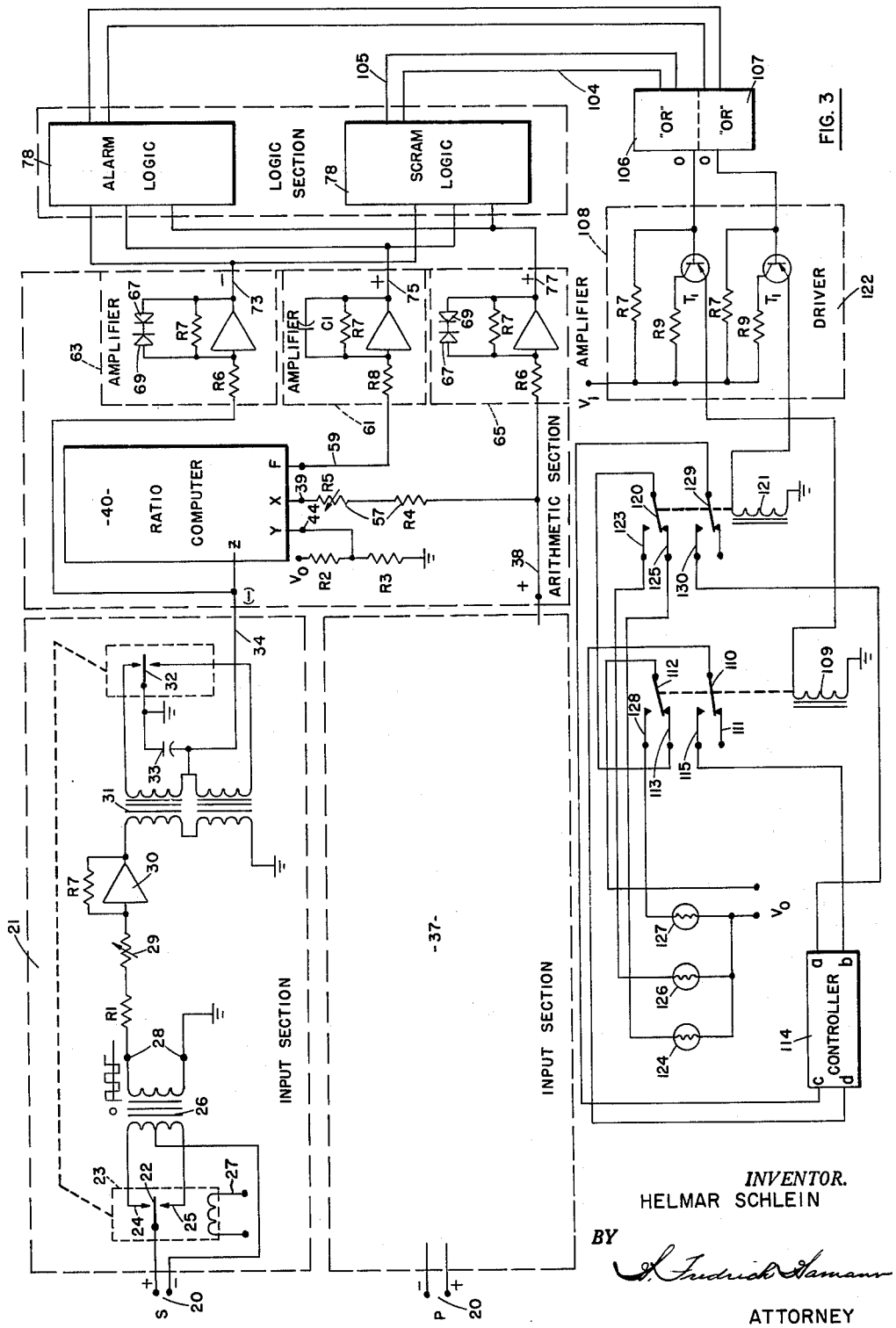
FIG. 3 is a circuit diagram of one embodiment of the present invention.

The flow/flow computer is shown in FIG. 3 as a means for accurately monitoring the coolant flow in each primary and secondary heat exchanger loop located between a nuclear reactor heat source and a steam generator. The flow in each loop is measured with an electromagnetic flowmeter. The flowmeter output 20, which has a floating ground, is fed through an amplifying circuit having an output of about 10 v. at full flow, which output is with respect to ground.

The transducers that operate the flow/flow computer are electromagnetic flowmeters. Two of these are required for each computer, one for the primary and one for the secondary loop. Their full scale output is approximately 30 millivolts D.C. with floating ground.

The power/flow computer, the second embodiment described herein, has seven inputs. Three of these are also derived from electromagnetic flowmeters. Three others are from floating output iron/constantan thermocouples whose maximum output is about 14 millivolts D.C. This is equivalent to 600° F. when the reference junction is at 150° F. The seventh input is the neutron flux signal. Its magnitude at 100 percent power is 10 volts positive with negative grounded. The input amplifier for the latter signal is a straight D.C. amplifier and its role in the computer will be discussed later.

*Input section*

The positive side of the input 20 from the flowmeter is connected to the arm 22 on one side of a double pole double throw chopper relay 23. Contacts 24 and 25 associated with arm 22 are connected to opposite sides of a transformer 26 which has its center tap connected to the negative side of input 20. The chopper 23 is driven by a coil 27. In this manner the output 28 across the secondary of transformer 26 has a wave form as shown in FIG. 3.

This output is connected through variable resistor 29 to the input of amplifier 30. The variable resistor 29 is provided to compensate for flowmeter characteristics so that the output of circuit 21 is 10 volts at full flow. The amplifier 30 is an all-transistor, feedback-stabilized operational amplifier well known in the art. (See Korn and Korn, Electronic Anolog Computers, second edition, McGraw-Hill, 1956.) The input wave form to transformers 31 from amplifier 30 is unmodified except as to amplitude. The secondary of transformer 31 is connected between the contacts associated with the second arm 32 of the double pole double throw synchronous chopper with the arm 32 connected through a 20 mfd. 25 v. capacitor 33 to the center tap of the secondary. The second chopper converts the wave form back to D.C. voltage with the capacitor 33 functioning to smooth the output. In this manner the differential input is amplified and converted to a grounded output signal having a maximum voltage output of —10 v. at full flow. This is the sole function of input circuit 21, and it is apparent that if the flow monitor output is of the grounded output type, the conversion portion of circuit 21 may be eliminated. The output 34 is a D.C. voltage having an amplitude directly proportional to the input signal 20. In the particular embodiment the input 20 has a maximum of about 30 millivolts D.C. for full coolant flow in the secondary heat exchanger (S).

The input signals are amplified by the differential type amplifiers having an overall gain range from 200 to 600. In the operation of the double pole choppers, one pole choppers the input at the 60 cycle driving frequency and the other pole is used to decommutate the 60 cycle square wave back to direct voltage.

The input transformer has an impedance ratio of 50,000 ohms to 500 ohms. A 10 millivolt input, for example, produces a 2 millivolt peak to peak signal across the secondary winding of the input transformer. The D.C. resistance of the full primary is about 4000 ohms.

A nominal gain of 333 in the overall differential amplifier, that is, from input 20 to output 34, requires a gain of 500 in the amplifier 30 itself. The voltage developed across the two series connected primary windings of the two output transformers 31 is then 500 millivolts.

The peak to peak square wave across the series connected secondaries of the output transformers is then about 7.5 volts. Decommutating and capacitor filtering of the square wave reduces the signal to 3.3 volts D.C. across the 20 mfd. capacitor. The overall gain of the entire differential amplifier is then 333. This value is adjustable by varying the series input resistor 29 of the operational amplifier 30.

It has been pointed out previously that operational amplifiers are chopper stabilized; a special internal feedback network containing a chopper is used to obtain gain, minimize drift, and stabilize the overall operation. When the external input chopper and the internal feedback chopper are driven in phase and at the same frequency, the feedback chopper will chop against ground at the same time that the pole of the external chopper makes on both contacts. This particular phasing action causes undesirable spikes on the internal chopper and an overall D.C. offset. These spikes are eliminated by shifting the phase of the driving current of the external chopper by about 40 electrical degrees with respect to the internal chopper so that the internal chopper sees a signal when it chops to ground. Phase shifting is accomplished by using two 6.3 volt filament transformers. One of these drives the internal chopper; the other has a 1 mfd. capacitor in its primary to shift the phase of the external chopper by the required amount.

The primary loop (P) has a flowmeter having a differential output which is converted and amplified in a second input circuit 37 which has an output 38 with a maximum voltage grounded output signal of +10 volts D.C. when full flow is achieved in the primary.

*Arithmetic section*

The outputs 34 and 38 of the two identical input circuits 21 and 37 represent the percentage of full coolant flow in the secondary and primary heat exchanger circuits, respectively, and are connected to the ratio computer 40 of the arithmetic section. It should be noted that while the signal representing flow in the secondary has a range of 0 to —10 volts, the signal representing the primary has a range of 0 to +10 volts. The ratio computer circuit performs the combined functions of division and multiplication and is designated herein as the single quadrant time-sharing multiplier/divider, or simply ratio computer.

Figure 4:
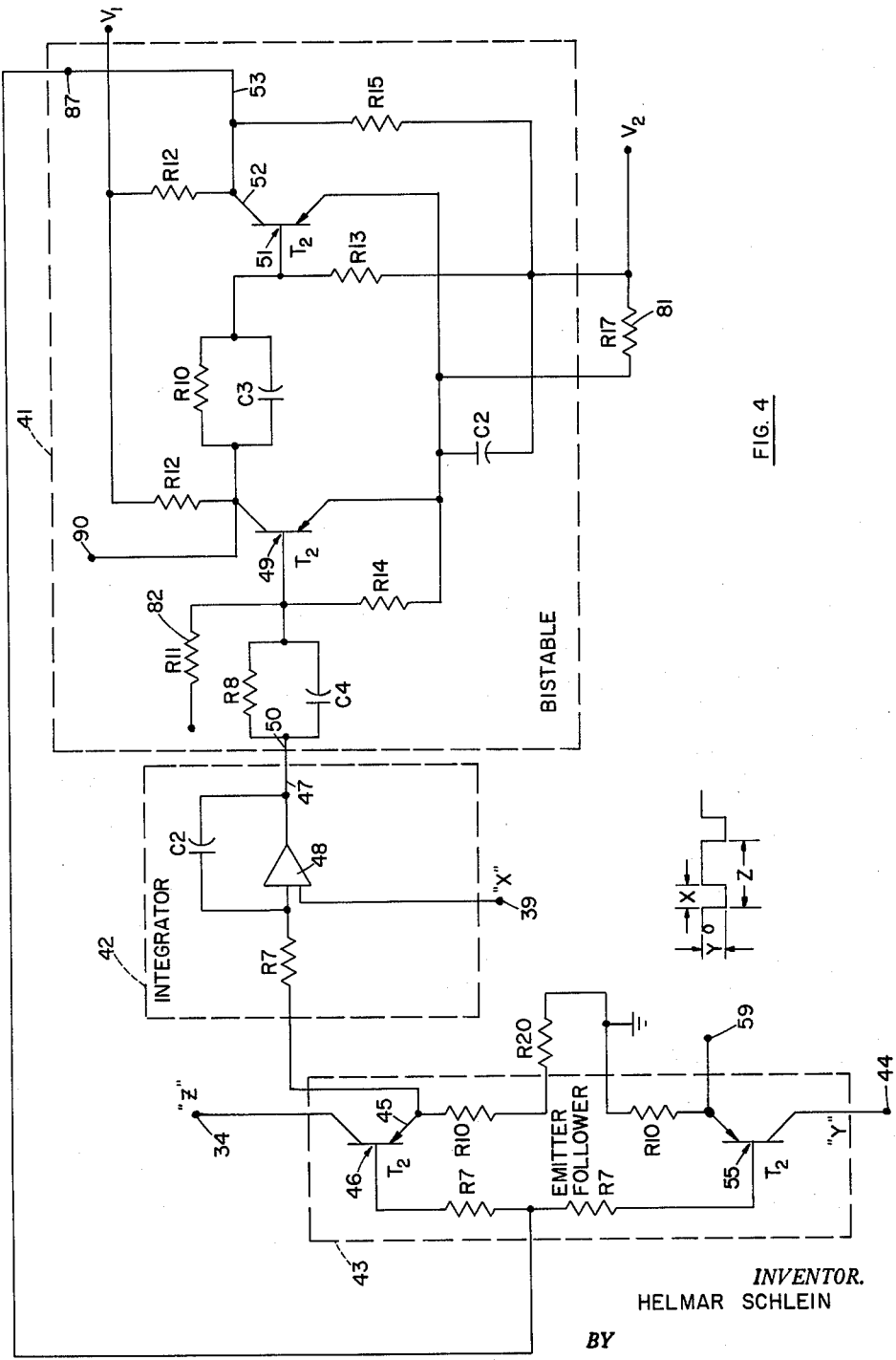
FIG. 4 is a detailed circuit diagram of a portion of FIG. 3.

The ratio computer 40 comprises three subcircuits, i.e., a bistable or modified Schmitt trigger used as a voltage level detecting device 41, an integrator 42, and a saturated emitter follower 43 and is shown in detail in FIG. 4.

The multiplier of FIG. 4 has inputs at 34, 39, and 44 consisting of two negative D.C. signals 34 and 44, designated Z and Y, and 39, a positive signal ranging nominally from 0 to 10 volts designated as X. A constant $k$ (see FIG. 3), whose value should not be smaller than 2 nor larger than 20, by proper component choice, is a part of X function input 39 and consists of resistances in series with the X input. For this application of the multiplier circuit the value of Y is made equal to a constant C which is fixed at 4.2 volts, and the value of $k$ is made equal to 4.2×3 or 12.6, as is explained in more detail hereinafter in the operation. The multiplier calculates the function $$F = -\frac{XY}{kZ}$$

The integrator section 42 has two inputs, X, which is always positive, and the other from the emitter 45 of the transistor 46 which is either equal to Z (a negative voltage) or zero, depending on whether 46 is conducting or cut off. The output 47 of the integrator 42 is a positive or negative ramp voltage which is a function of the sum of the input voltages and the time constant as defined by the feedback capacitor and the input resistor of amplifier 48. In general, as long as the input signals remain constant and their algebraic sum is negative, the output 47 of amplifier 48 will rise linearly until saturation occurs.

If the algebraic sum of the input changes sign, the output ramp will reverse direction.

The output ramp of the integrator 42 is directly coupled to a bistable trigger circuit 41 consisting of transistors 49 and 51, which is a modified Schmitt trigger circuit. The output 53 of the bistable 41 is taken from the collector 52. The voltage level at this point is about +8 as long as the output of integrator 42 is about +5.6 volts or larger. When the input signal to bistable 41 at input 50 becomes less than about +5.6 volts, the bistable output at 53 switches from +8 volts to about −12 volts. An input amplitude of +8.2 volts causes the bistable 41 to switch back from −12 volts to +8 volts.

The output of the bistable is coupled through two 100K resistors to the bases of transistors 46 and 55 of the saturated emitter follower 43. A positive voltage on the base of 46 and 55 cuts the transistors off. The emitter signal is now zero. Negative voltage on the bases of 46 and 55 allows the transistors to conduct heavily and the voltage on the emitters will be equal to Z and Y, respectively.

For this discussion, the rise in output of integrator 42, from 5.6 to 8.2 volts, is referred to as slope A and the change from 8.2 to 5.6 volts is referred to as slope B. An increase in Z causes no change in the magnitude of slope A; the magnitude of slope B increases because the input to the integrator 42 is increased during the conducting time of 46. Decreasing Z causes no change in slope A, but slope B now becomes smaller in magnitude. An increase in X increases slope A slightly and decreases slope B to a larger extent. Decreasing X has the opposite effect. The increase in X makes the net input voltage of integrator 42 more positive. The increase in net input voltage is weighted by the resistances 57 which make up $k$ and this is the reason for the changes in both slope A and B. The integrator 42 is inverting, that is, a positive input voltage gives a negative output slope and an increase in positive input signal will make the negative output ramp steeper. Thus X affects the width of the output pulse of 51 and also the pulse width at the output of 46, while Z affects primarily the pulse repetition rate. Transistors 46 and 55 are being driven in parallel and the pulse amplitude of the emitter output 59 is directly proportional to Y. The output of the multiplier 59 is a negative square wave clamped to zero. Its D.C. or average value is equal to the function F. It is therefore apparent that the output 59 has a wave form, as shown in FIG. 4, where X controls the pulse width, Y controls the pulse amplitude, and Z controls the pulse repetition rate. This output pulse chain at 59 provides an indication of $$\left(\frac{\text{Primary flow}}{\text{Secondary flow}}\right)\left(\frac{C}{k}\right)$$

or provides a representation of the equation $$F = -\left(\frac{X}{Z}\right)\left(\frac{Y}{k}\right)$$

In the embodiment of FIG. 3 the function Z is equal to the signal representing the secondary flow, i.e., at 34; the function Y is a constant equal to C, i.e., at 44; and X is equal to the signal representing the primary flow, i.e., at 38 multiplied by the constant $k$ of resistors 57. Thus the output at 59 is a ratio of primary to secondary flow multiplied by a constant $$\left(\frac{C}{k}\right)$$

which in this embodiment is equal to $4.2 \div 4.2 \times 3$ or .333. Thus when the primary and secondary flows are equal, averaged output of the multiplier section is −.333 volts.

The output 59 of the multiplier is connected to an amplifier circuit 61 in the arithmetical section of FIG. 3. The transfer function of the amplifier is essentially a high input impedance-low output impedance inverting RC integrator circuit. When $E_{in}$ is a series of pulses, then $−E_{out}$ equals the $E_{in}$ average. The circuit has a gain of 10 and an output of +3.33 volts D.C. when $P=S$.

Both of the outputs 34 and 38 of the input sections 21 and 37, respectively, are connected to amplifiers 63 and 65 having nominal gains of 3. The 1N713 diode 67 in each of the feedback loops is a Zener diode whose breakdown voltage is 9.1 volts. This diode 67 limits the amplifier output to that magnitude, preventing saturation of the amplifier. The 1N191 diodes 69 are used to block reverse voltages from developing in series in the diodes 67. It is apparent that circuits 63 and 65 are fully responsive and proportional to the primary and secondary signal for about the first 30 percent of the signal increase from zero. After the input to circuits 63 and 65 reaches a value where the diodes 67 are operating beyond the knee of their characteristic voltage/current curve, a constant voltage output of 9.1 volts results. In the particular embodiment the absolute values of the primary and secondary flow rate for the first 10 or 20 percent of the full flow rate are of interest. After this preselected value has been surpassed, only the ratio of the primary to secondary flow rates is of interest and the absolute values or percentages of full flow are no longer used in the computer. These factors will be more apparent from the following discussion of the selected operating curves. The limitation of amplifiers 63 and 65 to the first 30 percent of the signal is merely a convenient method of utilizing less costly components and is not a requirement of the present invention.

Logic section

Figure 5:
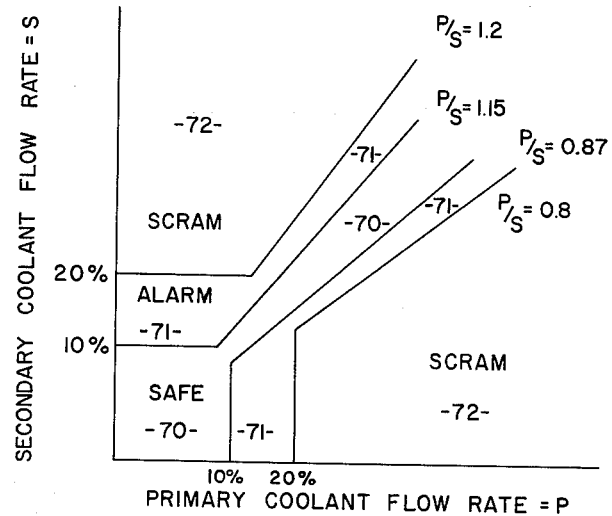
FIG. 5 is a graphical representation of the operating curves of the embodiment of FIG. 3.

For the particular embodiment described, the operating curves of FIG. 5 are applicable. This figure shows the various regions of safe 70, alarm 71, and scram 72 for various combinations of primary and secondary flow rate. After start-up of a reactor and its associated cooling systems, the following conditions are of interest: If both P and S are less than 10 percent of their final value and the ratio $P/S=R$, which is the ratio of primary to secondary flow rate, has any value, a safe condition is indicated. Also, if R is between the limits of 1.15 and 0.87 and both P and S have any value, the reactor is safe. Further, if both P and S are between the limits of 10 percent and 20 percent of their final value and if R is either larger than 1.15 or smaller than 0.87, an alarm condition is indicated. Also, if one of the variables P or S is less than 10 percent while the other one falls between the limits of 10 percent and 20 percent of their final value and if R is either larger than 1.15 or smaller than 0.87, an alarm is indicated. If both or either P and S are larger than 20 percent of their final value and if R is either between the limits of 1.15 and 1.2 or 0.87 and 0.80, then an alarm is again indicated. Finally, if either P or S is larger than 20 percent and R is either larger than 1.2 or smaller than 0.80, then a scram condition is indicated. While 10 percent and 20 percent, as well as the ratios of 0.80, 0.87, 1.15, and 1.2 have been used in the description of the first embodiment as defining the limits of the safe, alarm, and scram regions, it is apparent that other percentages as well as limiting ratios may be utilized and that the relative areas of the regions may be substantially increased or decreased depending upon the particular application. Further, the alarm region between the safe region and any one or both of the scram regions may be varied to meet individual conditions or eliminated if desired.

Figure 6:
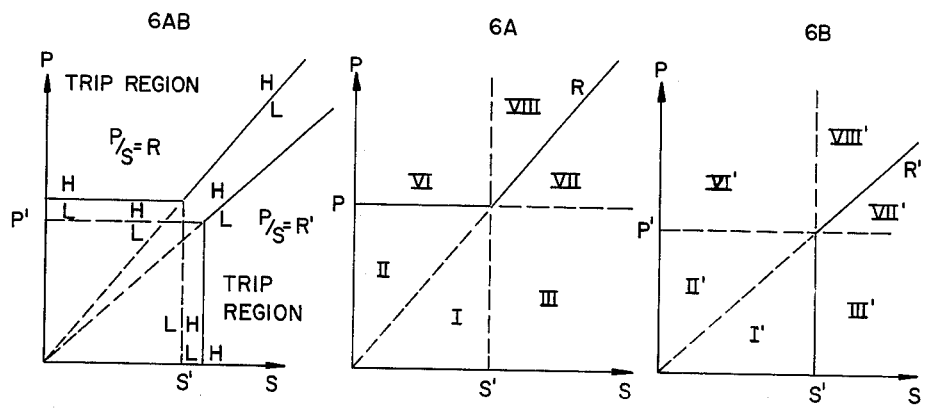
FIG. 6 is a graphical representation of the truth table conditions for the embodiment of FIG. 3.

The application of the operating curves to the computer will be more apparent from the following analysis of the computer logic and FIG. 5. The following discussion is directed to the boundary between the scram region and alarm region, but also applies to the safe-alarm boundary for the alarm logic. The curves of FIG. 6 are segregated into two parts identified as FIG. 6A and FIG. 6B. Using the three variables P, S, and R, where P is primary coolant flow rate, S is the secondary coolant flow rate, R is their largest acceptable ratio, and R' is their smallest acceptable ratio, S' is the value of S at the intersection of the R curve with the primary flow rate boundary, P' is the value of P at the intersection of the R' curve with the secondary flow rate boundary. An eight condition truth table can then be written as follows for each of the FIGURES 6A and 6B. In this table H and L refer to signal levels above and below trip settings, respectively.

TABLE I

| | Fig. 6A | | | | | Fig. 6B | | | |
|---|---|---|---|---|---|---|---|---|---|
| Condition | P | S' | R | Output | Condition | P' | S | R' | Output |
| I | L | L | L | 0 | I' | L | L | L | 0 |
| II | L | L | H | 0 | II' | L | L | H | 0 |
| III | L | H | L | 0 | III' | L | H | L | 1 |
| IV | L | H | H | 1 | IV' | L | H | H | 1 |
| V | H | L | L | 1 | V' | H | L | L | 1 |
| VI | H | L | H | 1 | VI' | H | L | H | 0 |
| VII | H | H | L | 0 | VII' | H | H | L | 1 |
| VIII | H | H | H | 1 | VIII' | H | H | H | 0 |

The geometry of the three variables P, S', and R shows that in FIG. 6A conditions I or II or III or VII are conditionally favorable, i.e., in these regions all values of P, S', and R are below the limit curve. Similarly, the geometry of the three variables P', S, and R' shows that in FIG. 6B conditions I', or II' or VI' or VIII' are conditionally favorable. The composite FIG. 6AB shows the signal levels below and above the trip setting or limit curves. In this figure it is apparent why, for example, the variables S' or P' may be high and yet a conditionally favorable condition exists. The outputs in Table I are assigned so that a "0" output (relay energized-safe) results from all conditions which are conditionally safe and a "1" output (relay de-energized-alarm or scram) results for all conditions which are not safe even though the conditions such as IV, V, IV', and V' are not physically realizable. It is therefore apparent that if conditions (I+II+III+VII) (I'+II'+VI'+VIII') exist, a "safe" indication is appropriate. The above expression is in Boolean notation where + is read "or" and multiplication is read "and." Cross multiplying the above equation results in 16 terms. Inspection of FIG. 6 shows that a number of these cross products are not realizable, since the function from which they are derived is single valued. Such terms are (I)(VI'), (II)(III') and others. Products such as (I)(I'), (III)(I') can exist since they have a common area in FIG. 6.

Writing out the equation, substituting the functions P, S', R, P', S, and R' for the particular condition I, II, etc., defining $\bar{R}$, $\bar{S}$, and $\bar{P}$ as "not R," "not S," and "not P," respectively, and substituting, a simplified equation $$(PS' + \bar{S}R)(P'S + \bar{P}\bar{R}') \quad (1)$$

is obtained. The dual of this equation is $$(\bar{P} + \bar{S}')(S' + \bar{R}) + (\bar{P}' + \bar{S})(P' + R') \quad (2)$$

Thus the variables in the logic section are $\bar{P}$, $\bar{S}'$, S', $\bar{R}$, P', $\bar{P}'$, R', and $\bar{S}$. This is the basis for the scram and alarm logic circuits of FIG. 3.

Referring again to FIG. 3, the negative output 73 of amplifier circuit 63 represents P, the positive output 75 of amplifier circuit 61 represents $P/S \times C/k \times 10$, or R, and the positive output 77 of circuit 65 represents S. These three signals define a point of operation with respect to the operating curves of FIG. 5.

Figure 7:
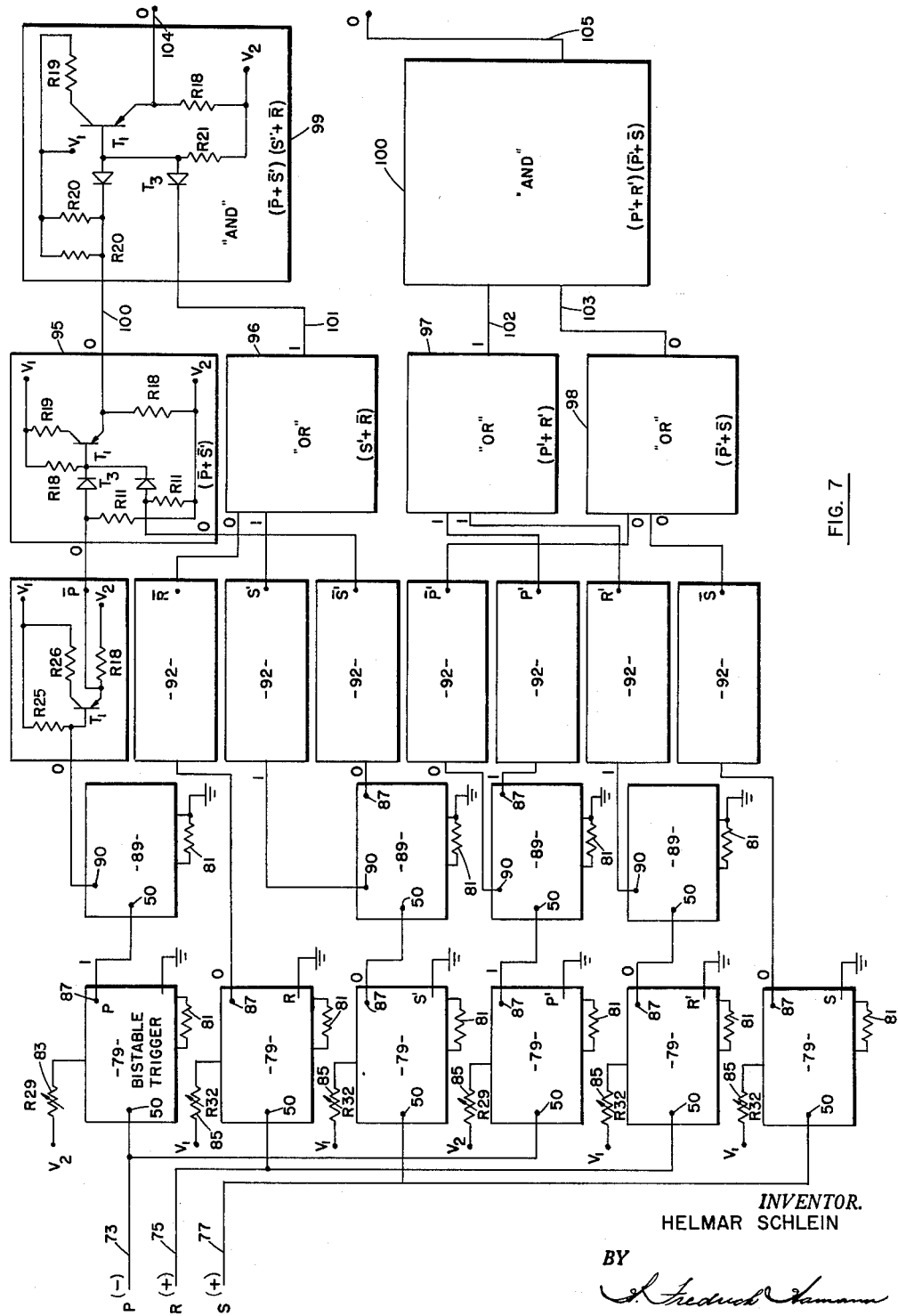
FIG. 7 is a diagram of the logic section of FIG. 3.

The logic circuits 78 utilized to determine the existence of an alarm or scram condition are essentially identical; only the scram logic circuit is described in detail with respect to FIG. 7. The circuit consists of six bistable trigger circuits 79 of the Schmitt type, one each for P, R, S, P', R', and S' with the P output 73 connected to the input 50 of the bistable 79 controlling both P and P', the R output 75 connected to the input 50 of the bistable 79 controlling R and R', and the S output 77 connected to the input 50 of the bistable 79 controlling S and S'. These bistable circuits 79 are similar to the bistable 41 of FIG. 4. The common emitter resistor 81 is changed to 56 ohms and returned to ground instead of +15 volts D.C. This change reduces hysteresis to about 40 mv. The base of the input transistor 49 is available through a 15K resistor 82 and is connected through a 200K, 25 turn rheostat 83 to a positive 15 volts for the negative input signal from 73, while for a positive input from 75 and 77 a 50K 25 turn rheostat 85 is connected to a negative 15 volts.

The input level at which the output 87 of the level detector 79 changes, i.e., the trigger level or limit value, is now adjustable between the limits of about 1.8 and 6.5 volts. For the particular conditions of FIG. 5 the rheostats 83 and 85 of the scram logic circuit have settings such that triggering occurs at levels of −6 v., +4 v., +4.8 v., −4.8 v., +2.66 v., and +6 v., for the P, R, S', P', R', and S level detectors, respectively, and for the alarm logic circuits corresponding values are −3 v., +3.83 v., +2.61 v., −2.61 v., +2.83 v., +3 v.

The outputs of level detectors 79 are "1" for P, "0" for R, "0" for S', "1" for P', "0" for R and "0" for S. However the variables used in the logic include $\bar{P}$, $\bar{S}'$, S', $\bar{S}$, $\bar{P}'$, $\bar{R}$, P', and R'. Thus four of the required variables, i.e., $\bar{P}'$, $\bar{P}$, $\bar{S}'$, and $\bar{R}$ are not available as fast changing direct outputs of level detectors 79. Signals for $\bar{P}$ must be "0" from the logic, so that an additional bistable 89 is connected to the output of level detector 79 to provide a "0," a fast changing output indicating $\bar{P}$. This additional circuit is essentially identical to the bistables 41 and 79 except that the common emitter resistor 81 is changed to 91 ohms to obtain a more favorable operating point. The outputs are taken at 90 for the level detectors 89. Detectors 89 are utilized in the present circuit as a matter of convenience for the following reason. The output 90 existing on the detectors 79, while available, is not a fast change or trigger-type output since the input is slowly changing in response to the generally slowly changing values of P, R, and S. By utilizing the fast response output 87 from the bistable level detectors 79 to drive the detectors 89 in these cases where both a "0" and a "1" output are required, both the outputs 87 and 90 are of the triggering type.

The outputs of level detectors 79 and 89 are 0, 0, 1, 0, 0, 1, 1, and 0 representing $\bar{P}$, $\bar{R}$, S', $\bar{S}'$, $\bar{P}'$, P', R', and $\bar{S}$, respectively. These are the variables of the logic Equation 2 above. These outputs of the level detectors and NOT circuits 79 and 89 are isolated from the OR and AND circuits by standard emitter follower circuits 92 to prevent loading and signal interaction.

The OR circuits 95 96, 97, and 98 shown in FIG. 7 are of the two-input type. Four identical OR circuits are used. Their normal input signal for a logic "0" is about −13 volts. If at least one input rises to a "1" or about −0.5 volt, the output at 96 will be "1." The passive OR circuit output is taken off the emitter to provide isolation. The first OR circuit 95 determines $\bar{P}$ or $\bar{S}'$, the second, 96, S' or $\bar{R}$, the third, 97, P' or R', and the fourth, 98, $\bar{P}'$, or $\bar{S}$.

Referring again to Table I, if $\bar{P}$, $\bar{S}'$, $\bar{R}$, $\bar{P}'$, $\bar{S}$, and $\bar{R}'$ are substituted for L in their respective columns and only safe conditions, i.e., outputs of "0" selected, we have:

TABLE II

| 79 | | | | | | | |
|---|---|---|---|---|---|---|---|
| I | $\bar{P}$ | $\bar{S}'$ | $\bar{R}$ | I' | $\bar{P}'$ | $\bar{S}$ | $\bar{R}'$ |
| II | $\bar{P}$ | $\bar{S}'$ | R | II' | $\bar{P}'$ | $\bar{S}$ | R' |
| III | $\bar{P}$ | S' | $\bar{R}$ | VI' | P' | $\bar{S}$ | R' |
| VII | P | S' | $\bar{R}$ | VIII' | P' | S | R' | as the eight conditions which give a "safe" indication. It will be noted that conditions I and II are independent of R, and III and VII are independent of P, i.e., that either R or $\overline{R}$ or P or $\overline{P}$ may exist without there necessarily being an "unsafe" condition. Similarly, conditions I' and II' are independent of R' and conditions VI' and VIII' are independent of S. Conditions IV, V, VI, and VII, and III', IV', V', and VII' are unsafe conditions having an output of "1." Conditions IV, V, and IV' and V' are physically not realizable. Conditions VI and VIII are unsafe regardless of S', while conditions III' and VII' are unsafe regardless of P'.

These various combinations are determined in the OR and AND circuits 95–98 and 99 and 100, respectively, which are standard circuits and are therefore not described in detail. OR circuit 95 determines $(\overline{P}+\overline{S}')$ and OR circuit 96 determines $(S'+\overline{R})$. At the start-up when all signal levels are below their trip set, the output 100 of 95 is "0," while the output 101 of 96 is "1." Thus, if either $\overline{P}$ or $\overline{S}'$ is untrue, then P or S' exists. Since Since $(P+\overline{S}')$ is independent of R and defines conditions V and VI, both of which are unsafe, the output 100 of 95 will be changed to "1" if P exists. If S' exists, the condition is $(\overline{P}+S')$, which is unsafe for R (condition IV) but safe for $\overline{R}$ (condition III), the output 100 will be "1," so that if R exists as determined by circuit 96, both outputs 100 and 101 will be "1" and AND circuit 99, which determines $(\overline{P}+\overline{S}')(S'+\overline{R})$ will have an output at 104 of "1," since circuit 99 has an output of "1" only when both inputs from 100 and 101 are "1." In circuit 96 $(S'+\overline{R})$ is independent of P and defines conditions III and VII, both of which are safe. If either S' or $\overline{R}$ is untrue, then $\overline{S}'$ or R exists. If $\overline{S}'$ exists, i.e. $(\overline{S}'+\overline{R})$, either condition I or V is present, I being safe and V being unsafe, depending upon whether $\overline{P}$ or P exists. If $\overline{S}'$ exists while $\overline{P}$ exists, it should be noted that the output 100 of circuit 95 is "0" and the output 101 of circuit 96 is "0." If $\overline{S}'$ exists while P exists, the output of both 95 and 96 is "1," indicating the unsafe condition V. If R exists, i.e., $(S'+R)$, either condition IV or VIII exists, both of which are unsafe. Both inputs to circuit 96 will then be "1" and the output will be "1," while the output 100 of circuit 95 will be changed to "1," since if S' exists, $\overline{S}'$ does not exist and the input of 95 from circuit 92 for $\overline{S}'$ will be "1." Therefore, the unsafe conditions IV, V, VI, and VIII will all result in a "1" output from AND circuit 99.

In a similar manner, the unsafe conditions III', IV', V', and VII' will result in a "1" at the output 105 of the AND circuit 100, which determines $(P'+R')(\overline{P}'+S)$.

The outputs 104 and 105 of the AND circuits 99 and 100 are connected to the inputs of OR circuit 106 (see FIG. 3) which is identical to the OR circuit 95. The OR circuit 106 determines $$(\overline{P}+\overline{S}')(S'+\overline{R})+(P'+R')(\overline{P}'+\overline{S})$$

so that if any one of the unsafe conditions IV, V, VI, VIII, III', IV', V', or VII' exist, the output from circuit 106 will be a "1."

*Output circuit*

Relay driver 108 is activated by the output of OR circuit 106 from the scram logic 78. The load of relay driver 108 is the coil of relay 109 with its arms 129 and 120. Associated with arm 120 are contacts 125 and 123 and associated with arm 129 is contact 130. A "0" signal is required on the input of driver 108 to energize coil 109. The relay is shown in the de-energized position.

Similarly, relay driver 122 is actuated by the output of OR circuit 107 from the alarm logic 78. The load of relay driver 122 is the coil of relay 121 with its arms 110 and 112. Associated with arm 110 is contact 115 and associated with arm 112 are contacts 113 and 128. A "0" signal is required on the input of driver 122 to energize coil 121. The relay is also shown in its de-energized state.

When a safe condition exists, the outputs of OR circuits 106 and 107 are "0" and coils 109 and 121 are energized. One side of the 6.3 volt A.C. line, $V_0$, goes through arm 112 to contact 128 through lamp 127 to the other side of the 6.3 volt A.C. line to light up said lamp. Contact $a$ of controller 114 connects through arm 112 and contact 113 back to contact $b$, thus providing continuity for external control or indication. Similarly, contact $c$ of controller 114 connects through arm 129 and control 130 back to contact $d$, also providing continuity for external use.

In the alarm condition OR circuit 107 has a "1" output, thus de-energizing relay 121. One side of the 6.3 volt A.C. line $V_0$ goes through arm 112 to contact 113 to arm 120 and contact 125 through lamp 126 lighting up said lamp and extinguishing lamp 127. Also the connection between contact 113 and arm 112 is broken, causing discontinuity between $a$ and $b$ of controller 114.

In the scram condition which can occur only after an alarm condition, outputs of OR circuits 106 and 107 are both "1," now de-energizing both relay coils 109 and 121. Following one side of the 6.3 volt A.C. line goes through arm 112 to contact 113 to arm 120 to contact 123 to lamp 124, causing it to light up. Also, contact $c$ of controller 114 going to arm 129 is now disconnected from contact $d$ of controller 114.

The automatic controller 114 is connected across arm 129 and arm 110 so that an alarm condition which de-energizes coil 109 disconnects 110 and 115 and a scram condition disconnects 129 and 130. The controller 114 is responsive to either of these disconnections to activate electrically operated valves or control rods, or energize a personnel warning system. It is apparent that the trip conditions either for an alarm or for a scram condition indication are defined by two boundaries, either of which may be independently selected by the choice in the setting of rheostats 83 and 85 for the scram logic and similar rheostats in the alarm section. Although in the particular embodiment described the variable outputs of circuits 63 and 65 are limited to about the first thirty percent before saturation, by proper selection of components this range may be increased or decreased as desired for particular applications. Furthermore, the various trip boundaries between safe and alarm, or alarm and scram conditions may be selected as desired. Thus this embodiment of the present invention provides for the logical division of sensing regions and the developing of monitoring signals responsive to the logical division.

POWER/FLOW COMPUTER

The second embodiment of the present invention is shown in FIG. 8, referred to herein as the power/flow computer, and has seven inputs. Three of these are derived from electromagnetic flowmeters and are designated $W_1$, $W_2$, and $W_3$. Three are derived from floating output iron/constantan thermocouples having a maximum output of about 14 mv. D.C. and are designated $T_1$, $T_2$, and $T_3$. The seventh input is the neutron flux signal $n$, having a magnitude at 100 percent power of 10 volts positive with negative grounded.

*Input section*

The flowmeter and thermocouple variable signals are amplified by differential amplifiers of the chopper input type. Differential type input amplifiers 21 are used as in the first embodiment and their function and operation is the same as described above.

*Arithmetic section*

The outputs 130, 132, and 134 of amplifiers 21 are connected to the summing network 136 which adds $W_1$, $W_2$, and $W_3$, sums and power amplifies the signal with a voltage gain of ⅓, and converts the output signal $W_T$ to a negative voltage, thereby providing a 0 to −10 volt output at 137. The output 137 is connected to each of three ratio computers 140, 141, and 142, of the type shown in FIG. 4 and described in detail above, at pin 44. The individual outputs 130, 132, and 134, representing $W_1$, $W_2$, and $W_3$, are connected to ratio computers 140, 141, and 142 at pin 34 (see FIG. 4). The positive outputs 131, 133, and 135, representing $T_1$, $T_2$, and $T_3$, are connected to input connection 39 (see FIG. 4) of ratio computers 140, 141, and 142, through a resistance network 143 including a fixed and a variable resistor as explained above with respect to the first embodiment, representing the constants $k_1$, $k_2$, and $k_3$, respectively. The ratio computers 140, 141, and 142 calculate the function $$F_1 = \frac{T_1 W_1}{W_T k_1}, \quad F_2 = \frac{T_2 W_2}{W_T k_2}, \text{ and } F_3 = \frac{T_3 W_3}{W_T k_3}$$

where the value of $k$ is dependent upon the value of "C," as explained hereinafter, and have their respective outputs 144, 145, and 146 (pin 59 of FIG. 4) added and multiplied by a factor of two in summation and averaging circuit 147.

The "$n$" signal having an input range of 0 to 10 volts is converted in circuit 150 so that the output at 151 is a signal having a maximum signal of 3 volts D.C. representing 100 percent neutron flux at full power. This output 151 is connected through a fixed and variable resistor network 152 representing a constant $k_n$ to a ratio computer 153. The computer 153 is connected at 44 to the $W_T$ output at 137 while input connector 34 is connected to the arm of a variable resistor in resistor network 154. Network 154 introduces a second constant "C" which is a conversion factor to convert the dimension of neutron flux to the dimension of temperature. The ratio computer 153 calculates the function $$F_4 = \frac{C_n}{W_T k_n}$$

and has its output 155 added with $F_1$, $F_2$, and $F_3$ in summation and averaging circuit 147 after multiplication by a factor of 4. The output of circuit 147 is then $$T_0 = \frac{T_1 W_1}{W_T k_1} + \frac{T_2 W_2}{W_T k_2} + \frac{T_3 W_3}{W_T k_3} + \frac{C_n}{W_T k_n}$$

or $$T_0 = T_{in} \frac{C_n}{W_T k_n}$$

In the present reactor application of the invention at steady state operation of the output temperature is taken as 1000° F. and the input temperature as 600° F. so that a 400° F. ΔT exists across the core. Thus the ratio of input temperature to temperature rise in the core is 3 to 2. This factor is taken into account in the values of C and $k$. For example, for $$\frac{C_n}{W_T k_n}$$

if the neutron flux signal is taken to be 100 percent, i.e., 3 volts at 151, and $W_T$ is taken at full flow in all loops, i.e. $W_T = 30/3$ or 10, we have $$\frac{0.3C}{k_n}$$

If C is taken as 5 and $k_n$ is taken as 3, we have $$\frac{C_n}{W_T k_n} = 0.5 \text{ volt}$$

This is multiplied by 4 in network 147. For $$\frac{T_1 W_1}{W_T k_1}$$

for example, $T_1 = 6$, $W_1 = 10$, $W_T = 10$, for steady-state operation, so that $k_1$ must be 12 for a $$\frac{T_1 W_1}{W_T k_1}$$

to equal 0.5 volt. This is multiplied by two in network 147. In this manner, the ratio of 3 to 2 for the input temperature to temperature rise across the core is incorporated into the output of amplifier circuit 147.

Both the $W_T$ output 137 and the $n$ output 151 are connected through amplifier circuits 63 and 65 similar to those of the embodiment of FIG. 3, except that in this case the "$n$" amplifier circuit 65 has a gain of 10. Thus, four variable signals $W_T$, $T_0$, $n$, and $n_h$ are available at the outputs of circuits 63, 147, and 65, with $n_h$ being the unamplified output at 151 having a voltage range of from 0 to 3 volts, while $W_T$, $T_0$, and $n$ have ranges of from 0 to 5 volts for $T_0$ and 0 to saturation voltage for $W_T$ and $n$. In the cases of $W_T$ and $n$, here again, as in the first embodiment, only the first 30 percent of the absolute value of these two variables is of interest in determining a portion of the trip curves. This will be more apparent from the following discussion of the selected operating curves for the second embodiment.

Logic section

For the particular embodiment described, the operating curves of FIGS. 9A, 9B, and 9C are applicable. FIG. 9A shows a pictorial relationship between $n$ and $W_T$ and indicates the safe region 160, i.e., below 12 percent of the neutron flux at full power, the alarm region 161, i.e., between 12 and 16 percent, the setback region between 16 and 20 percent, and the scram region 163 above 20 percent. It should be noted that the area to the right of lines 164 is not a scram region but may be safe, alarm, or setback, depending upon the value of $T_0$ at the particular time. This relationship is shown in FIG. 9B where curve 165 has been preselected as $T_0 = 962°$ F., 166 represents $T_0 = 996°$ F., and 167 represents $T_0 = 1030°$ F. Thus FIGS. 9A and 9B must be taken together in order to determine the existence of a safe, alarm, setback, or scram condition. Further, superimposed on both of these criteria is a third, represented in FIG. 9C, showing neutron flux independently of T or W and defining another set of criteria for safe, alarm, setback, or scram conditions.

FIG. 10 is a pictorial representation, not a graph, of $n$, W and $T_0$ and is presented to more clearly explain the safe and trip condition logic to be used. Only the logic for the safe/trip condition for the transition from safe to alarm will be described in detail, since the others are identical except for the value at which the trip takes place.

FIG. 10 shows that areas I, II, III and VII are safe, while conditions VI and VIII are alarm conditions and IV and V are not physically realizable and must be considered as alarm conditions for a fail-safe system. An eight-condition truth table can be written as follows:

TABLE III

| Condition | $n$ | W | $T_0$ | Output |
|---|---|---|---|---|
| I | L | L | L | 0 |
| II | L | L | H | 0 |
| III | L | H | L | 0 |
| IV | L | H | H | 1 |
| V | H | L | L | 1 |
| VI | H | L | H | 1 |
| VII | H | H | L | 0 |
| VIII | H | H | H | 1 | where L and H refer to signal levels below and above trip settings, respectively, and "0" and "1" output means relay energized and relay de-energized, respectively. It should be noted that $n_h$, i.e., the high power cut-off, may simply be tacked onto the above logic through an OR function as described hereinafter, so that it will always operate regardless of any other computer operation. The Boolean notation may again be used, i.e.:

$$(\bar{n}+\overline{W}+\overline{T}_0)(\bar{n}+\overline{W}+T_0)(\bar{n}+W+\overline{T}_0)(n+W+\overline{T}_0)$$

It is possible to simplify this equation to $$(\bar{n}+\overline{W})(W+\overline{T}_0)$$

However, in this simplified version of the logic, non-fail-safe operations are possible. For example, if the capacitor of circuit 147 of FIG. 8 is defective, then $T_0$ could exceed a safe value and operation would continue until $W_T$ for area 160 was exceeded. Since, particularly for reactor operations, all possible unsafe conditions should be apparent at start-up and not masked until operations are under way, the simplified version was not utilized in this particular embodiment. It should be noted that FIG. 10 has been presented herein essentially as a two-dimensional representation. However, actually a three-dimensional graph of $W_T$, $T_0$, and $n$ could be plotted which would generate a volume where the operating curve would appear as a three-dimensional surface. Such a complex three-dimensional plot of the relationship $$T_0 = \frac{T_1 W_1 + T_2 W_2 + T_3 W_3}{W_T} + \frac{C_n}{W_T k}$$

as a function of $n$ and $W_T$ has been avoided in order to simplify this presentation. It will be understood that herein the term "area" or "region" is used with respect to the pictorial representation of FIG. 10 as including the volumes defined by any three-dimensional graph of the variables represented in FIG. 10.

Referring again to FIG. 8, the positive output of amplifier circuit 63 represents $W_T$, the positive output of circuit 147 represents $T_0$, the negative output of amplifier circuit 65 represents $n$, and the output 151 is used as $n_h$. The signals representing $W_T$, $T_0$, and $n$ define an operating point with respect to the curves in FIG. 10.

The logic circuits utilized to determine the existence of an alarm, setback, or scram are shown in FIG. 8 as 170, 171, and 172 and are essentially identical. Only the setback logic circuit is described in detail with respect to FIG. 11.

This logic circuit consists of four bistable trigger circuits 79 (see circuit 41 of FIG. 4), the same as used in the previously described embodiment, one each for $W_T$, $T_0$, $n$, and $n_h$. Each of these bistable trigger circuits has the base of the input transistor 49 (see FIG. 4) connected through rheostat 173 to a voltage source, a 50K rheostat and a −15 volt source for the bistable 79 for $W_T$, $T_0$, and $n_h$ and a 200K rheostat and a +15 volt source for the bistable 79 for $n$. The common emitter resistor is 56 ohms as in the logic circuit of the previously described embodiment. The input level at which the output of the level detector 79 changes i.e., the limit value or setting, is now adjustable between the limits of 1.8 volts and 6.5 volts. For the conditions of FIGS. 9 and 10 the rheostats 173 of the various logic circuits have settings such that triggering occurs at the following signal levels:

TABLE IV

| | Volts | | |
|---|---|---|---|
| | Alarm | Setback | Scram |
| $W_T$ | +3.6 | +4.8 | +6 |
| $T_0$ | +4.81 | +4.98 | +5.15 |
| $n$ | −3.6 | −4.8 | −6 |
| $n_h$ | +3.18 | +3.45 | +3.75 |

The outputs of level detectors are "0" for $W_T$, "0" for $T_0$, "1" for $n$, and "0" for $n_h$. However, the variables used in the logic include $\overline{W}_T$, $\overline{T}_0$, $\bar{n}$, which are not available as trigger outputs from level detectors 79. An additional bistable 89 is connected to the output 87 of the $W_T$, $T_0$, and $n$ bistables 79 in the same manner as described above with respect to FIG. 7. In this manner the outputs from level detectors 89 are "1," "0," "0," "1," "0," and "1," representing $W_T$, $\overline{W}_T$, $\overline{T}_0$, $T_0$, $\bar{n}$, and $n$. Each of the outputs 174 is connected through an emitter follower 175 identical with the emitter follower 92 shown in FIG. 7, to an OR circuit 176. An OR circuit 176, 177, 178, and 178 is provided for each of the conditions $$(\bar{n}+\overline{W}_T+\overline{T}_0)$$

$(\bar{n}+\overline{W}_T+T_0)$ $(\bar{n}+\overline{W}_T+\overline{T}_0)$, and $n+\overline{W}_T+\overline{T}_0)$ and each is appropriately connected to the emitter followers 175. Circuit 176, which is shown in detail in FIG. 11, is a standard three-input OR circuit and is not herein described in detail. Each circuit has an output of "0" if all inputs are "0," and an output of "1" if one or more of the inputs are "1." The four input AND circuits 180, of standard construction, have an output of "1" only if all inputs are "1."

Referring again to Table III and substituting NOT for L, we have

TABLE V

| Condition | | | | Output |
|---|---|---|---|---|
| I | $\bar{n}$ | $\overline{W}_T$ | $\overline{T}_0$ | 0 |
| II | $\bar{n}$ | $\overline{W}_T$ | $T_0$ | 0 |
| III | $\bar{n}$ | $W_T$ | $\overline{T}_0$ | 0 |
| IV | $\bar{n}$ | $W_T$ | $T_0$ | 1 |
| V | $n$ | $\overline{W}_T$ | $\overline{T}_0$ | 1 |
| VI | $n$ | $\overline{W}_T$ | $T_0$ | 1 |
| VII | $n$ | $W_T$ | $\overline{T}_0$ | 0 |
| VIII | $n$ | $W_T$ | $T_0$ | 1 |

It is apparent that conditions I and II, which are both safe, are independent of $T_0$. Thus, in 176 and 178 if $\overline{T}_0$ changes to $T_0$, the output of 176 changes to "1" but the output of 178 changes to "0"; $n$ and $W_T$ are unchanged, so that the input to 180 will now be "1," "1," "0," "1," and the output of 180 will remain "0." Conditions III and VII, which are both safe, are independent of $n$. Thus in 177 and 179 if $\bar{n}$ changes to $n$, the output of 176 changes to "1" while the output of 178 will remain "1." The output of 176 will be changed to "1" and the output of 178 will remain "1," so that AND circuit 180 will have an output of "1" for an unsafe condition. This is more apparent from Table V when it is noted that $n+\overline{W}_T+\overline{T}_0$ is the imaginary condition V which is defined as unsafe. If both $W_T$ and $T_0$ exist, i.e., $\overline{W}_T$ and $\overline{T}_0$ are no longer true, then 176 will have an output of "1," 177 will have an output of "1," 178 will have an output of "1," and 179 will have an output of "1." These outputs will be "1" independent of $n$, since both conditions IV and VIII are unsafe independent of $n$. If $n$ and $W_T$ exist, the output of 176 is "1," the output of 177 is "1," the output of 178 is "1," and the output of 179 will be "0," since $\overline{T}_0$ exists and condition VII is safe. If $\overline{T}_0$ changes to $T_0$, i.e., if $T_0$ is exceeded, then the output of 179 changes to a "1" while the other outputs remain "1," since condition VII is now present. It is therefore apparent that the logic circuit output of the AND circuit 180 is "0" for all safe conditions I, II, III, and VII and "1" for all unsafe conditions IV, V, VI, and VIII. The $n_h$ trip settings in the alarm, setback and scram logic sections 170, 171, and 172 have their outputs connected through emitter follower 175, located for convenience in the setback logic section shown in FIG. 11, to OR circuits 181, 182, and 183. The output of the alarm logic section 170, the setback logic section 171, and the scram logic section 172 are also connected to the OR circuit. OR circuit 181 has connections to the alarm logic section 170 and the $\bar{n}_h$ output for alarm; OR circuit 182 has connections to the setback logic 171 and the $\bar{n}_h$ output for setback; while OR circuit 183 has connections to the scram logic section 172 and the $n_h$ output for scram. Thus OR circuits 181, 182, and 183 require either a "1" output from the alarm, setback or scram section output, respectively, or a "1" output from $n_h$ for the respective section. As noted from FIGS. 9A, 9B, and 9C, the logic sections 170, 171, and 172 determine whether 12, 16, or 20 percent of neutron flux at full power has been exceeded as well as whether the prescribed limits of W and T have been exceeded, while $n_h$ as defined in FIG. 9C, is a value independent of W or T which determines an alarm setback or scram condition based solely upon the value of $n$. The OR circuits 181–183 make this determination and indicate by a "1" output when any of the conditions are unsafe.

*Output circuits*

The outputs of OR circuits 181–183 (see FIG. 8A) are fed through driver circuits 184, identical to drivers 108 of the embodiment of FIG. 3, to coils 185, 186, and 187 of the alarm, setback, and scram relays 188, 189, and 190. Each of the coils 185, 186, and 187 are energized for a "0" output from OR circuits 181, 182, and 183, respectively, i.e., for a safe condition to provide for fail-safe operation. However, as shown in FIG. 8A, the relays are each shown in their de-energized position representing an unsafe condition existing on each of the alarm, setback, and scram systems.

The power/flow computer measures the reactor outlet temperature $T_0$ during steady-state operating conditions. During long-time thermal transients it predicts what the outlet temperature will be after the transient has died out. The equation that the computer calculates is $$T_0 = T_{in} + \frac{C_n}{W}$$

The expression $$\frac{C_n}{W_k}$$

represents the temperature difference across the reactor core. When $T_{in}$ decreases because more heat is taken out in the intermediate heat exchanger, the reactor outlet temperature does not change immediately because of the large thermal inertia in the reactor and the coolant. The computer will, however, immediately predict a new power outlet temperature. The reactor operator then makes the necessary adjustments to maintain proper operating temperature levels.

The computer calculates $T_{in}$ as follows. Coolant flow signals 130, 132, and 134 having an output amplitude for 100 percent of flow of 10 volts on each channel are summed and divided by three in circuit 136. Division by three is necessary because the amplifier becomes non-linear when its output exceeds about 13 volts and it saturates at 15 volts. The divisor introduced by necessity is compensated for in the multipliers. The second amplifier inverts the calculated W signal, amplifier circuit 63 multiplies by three and inverts the W signal again to drive the level detectors. Circuit 63 is limited by a Zener diode to a total output of 9.1 volts. It only has to be operative in the range when W, at 137, is in the range from about 1 to 3 volts which is the tripping level of the detectors. Once the detectors have been tripped, additional lever increases have no further effect.

Three multipliers are associated with the calculation of $T_{in}$. They calculate the expressions:

$$\frac{T_1 W_1}{W_T k_1}; \frac{T_2 W_2}{W_T k_2}; \frac{T_3 W_3}{W_T k_3}$$

where $T_1$, $T_2$, $T_3$, $W_1$, $W_2$, $W_3$, and W are as defined above. The multiplying constants $k_1$, $k_2$, and $k_3$ are equal to each other. When $W_1 = W_2 = W_3$ the expression $$\frac{T_1 W_1}{W_T k_1} = \frac{T_1}{k}$$

and if $T_1 = T_2 = T_3$ then $$T_{in} = \frac{3T}{k}$$

The normal operating value of $T_{in}$ will be ~600° F.

The remaining one of the seven inputs is "$n$," proportional to the neutron flux. It is furnished to the computer from the nuclear panel and equals 10 volts for 100 percent neutron power with the polarity indicated in FIG. 8. The signal is divided by three by amplifier 150 to make it compatible with the division of three performed earlier on W. The next amplifier merely inverts the polarity of the signal. The fourth multiplier in the power/flow computer calculates $$\frac{C_n}{W_T k_n}$$

C may be varied in values with a potentiometer between the limits of 2 and 10 volts. The averaging-summing network 147 multiplies as it sums $T_{in}$ by a factor of 2 and also multiplies the ratio $$\frac{C_n}{W_T k_n}$$

by a factor of 4. At the output of 147 the resulting $T_0$ is now made up of the sum of $T_{in} = 3$ volts when the intermediate heat exchanger outlet temperature is 600° F. and $$\frac{C_n}{W_T k_n} = 2 \text{ volts}$$

at the output of amplifier 147 at 100 percent neutron flux. This corresponds to 400° F. temperature rise across the core. $T_0$ full scale is then 5 volts, which corresponds to 1000° F. outlet temperature. Rewriting the equation for $T_0$ slightly $$T_0 = \frac{T_1 W_1 + T_2 W_2 + T_3 W_3 + C_n}{W_1 + W_2 + W_3}$$

it becomes apparent that $T_0$ can still equal 1000° F. at different flow ratios in the three primary loops when the intermediate heat exchanger outlet temperatures of the three loops are also different from each other. It is important that the ratio between $T_{in}$ and neutron flux corresponds to the actual temperature ratio at full power so that the computer will always calculate the correct $T_0$.

In addition to a trip on high $T_0$ the power/flow computer also has a trip provision at high neutron flux. Three level detectors, one each for alarm, setback, and scram, are in the respective logic section. They are designated as $n_h$ in FIG. 11. The signal for this trip is derived from 151; its amplitude at 100 percent neutron flux is 3 volts. This is the same signal that is also one of the inputs of the $n$ multiplier. High flux level trips occur at 106 percent, 115 percent, and 125 percent of full neutron flux. The actual trip voltages are therefore 3.18, 3.45, and 3.75 volts for alarm, setback, and scram, respectively.

The output of the level detectors, after isolation by previously described emitter followers, becomes one of the inputs of a two-input OR circuit. The other input to this OR circuit is the output of the $T_0$ logic. Thus the appropriate output relay will be de-energized when $T_0$ is high or when $n_h$ is high. It should be recalled that the terminology of "high" refers to signal conditions above their desired trip settings. Actually a high signal will cause a "1" output on the OR circuit, which in turn corresponds to a voltage level of −0.5 volt.

By way of example, the value of resistors, R, voltages, V, and capacitors, C, and the type of transistors employed in the various circuits of the present invention may be as follows:

R₁=47 ohms
R₂=1210 ohms
R₃=475 ohms
R₄=750K
R₅=1M (Pot.)
R₆=33.2K
R₇=100K
R₈=10K
R₉=150 ohms
R₁₀=22K
R₁₁=15K
R₁₂=2.2K
R₁₃=18K
R₁₄=6.8K
R₁₅=27K
R₁₆=56 ohms
R₁₇=680 ohms
R₁₈=5.6K
R₁₉=100 ohms
R₂₀=56K
R₂₁=33K
R₂₂=620 ohms R₂₃=240 ohms
R₂₄=1K
R₂₅=150K
R₂₆=180 ohms
R₂₇=5K (Pot.)
R₂₈=330K
R₂₉=200K (Pot.)
R₃₀=49.9K
R₃₁=29.9K
R₃₂=50K (Pot.)

C₁=4.5 μf. 30 v.
C₂=0.01 μf. 100 v.
C₃=220 μμf. 500 v.
C₄=150 μμf. 500 v.

T₁=2N414
T₂=2N404
T₃=1N191
T₄=1N713

V₀=6.3 v. A.C.
V₁=−15 v. D.C.
V₂=+15 v. D.C.

All amplifiers utilized in the embodiments of the present invention are direct coupled, chopper stabilized, amplifiers well known in the art.

While the second embodiment has been described with relation to a three-loop system, it will be apparent to those skilled in the art that it is equally applicable in a simplified form to a single-loop system where the variables are W, T₀, and n, with or without the added conditions associated with n_h. In such a simplified system T₀ would be equal to $$T_{in} + \frac{C_n}{W_k}$$

so that the third variable utilized in the logic sections is not simply a ratio, as in the first embodiment, but is one of the input variables plus the computed ratio between the other variables. This method is utilized herein to predict the reactor outlet temperature T₀. While it is apparent that the outlet temperature may be measured directly and computations made with this measured quantity, in a system such as a reactor the time lag in outlet temperature change may be of the order of several minutes. Such a time lag could result in severe thermal shocks taking place within the system without an indication that such an unsafe condition is existing. Thus the method of predicting this temperature is utilized herein in order to provide a safer operating system, since if the predicted T₀ is greater than the norm, i.e., 962° F., then an alarm condition will be indicated before the actual unsafe condition exists.

It is apparent that in the first embodiment the values of two variable parameters are determined, P, and S, and a function is computed which is the ratio of these two values, i.e., the parameter R. In the second embodiment in its simplest form, i.e., utilizing only one loop, the values of three variable parameters are determined, i.e., T_in, n, and W_T, where T_in=T₁ and W_T=W₁. A function is then computed, T₀, which includes as one of its terms the ratio between two of the variable values $$\frac{n}{W_T}$$

plus a third variable value T_in. In this case the determination of T_in and W_T may be made by direct measurement. In the three-loop system of the second embodiment T_in is equal to $$\frac{T_1 W_1 + T_2 W_2 + T_3 W_3}{W_T}$$

and the determinations of T_in and W_T are made by a series of computations. However, in both the one-loop and three-loop systems of the second embodiment T₀ is a computed value. Therefore as used herein the term "determined" is defined as meaning measured and/or computed. Thus the values of P, S, W_T, n, and T_in are continuously determined or measured, while the values of T₀ and R are continuously determined or computed in the arithmetic sections. Both of the computed parameters T₀ and R are predetermined functions of *all* of the variables of the system in the two embodiments described. Thus T₀ is a function of W₁, W₂, W₃, T₁, T₂, T₃, and n, while R is a function of both P and S, the only two variables of the first embodiment. The factors C, k, k₁, k₂, k₃, and k_n are constants for the particular systems and are introduced merely as conversion factors and to compensate for amplification factors.

The determined or pertinent parameters P, S, R, and T₀, n and W_T are the input signals for the logic circuit in which they are compared with predetermined limit values. This comparison results in a determination whether the input signal has reached the limit value or not and an indication is given as to the sense of that signal with respect to its limit value, as at the output of emitter followers 92 and 175. The indications are then compared in predetermined groups where each group defines a portion of the total region bounded by an operating curve defined by the limit values. Thus in FIG. 6 the alarm logic section has a limit value of 10 percent of P at full flow, which defines the boundary between the regions of operation I and II and III and regions of operation VI and VII and VIII. Similarly, the limit value of S' defines the boundary between regions I, II, and VI and regions III, VII, and VIII. The indications from these two determinations could then be compared, if acceptable operation was limited to regions I and II only, and a determination made that only regions I and II were common to the area defined by the limit values. In such a case, only OR circuit 95 would be required. In the present invention the operating curve is composed of several portions of curves which define the boundaries of the acceptable operating regions. A plurality of operating curves may also be utilized to determine the sense of the variation of the operation with respect to the acceptable regions, i.e., by using an alarm-scram boundary or an alarm-setback and a setback-scram boundary. Thus in both embodiments limit values define the acceptable optimum of each of the selected governing parameters and boundaries of an operating region. The boundaries defined by the limit values are, in essence, collectively super-imposed upon each other in a predetermined manner so that an operating curve is formed. Each operating curve defines two composite regions; one is an acceptable composite region, the other is an unacceptable composite region for the particular curve. This is accomplished in the present invention by comparing the indications of the relationship of each parameter with its limit setting in preselected groups. The parameters chosen in each group are selected to define at least one operating region, or portion of a composite region. Thus in FIG. 7 the comparison made in OR circuit 95 is a determination whether the parameters define an operating point within regions I or II; the comparison in circuit 96 is a determination whether the operating point is within regions III or VII; similarly, circuit 97 determines if the point is within regions VI' and VIII'; and circuit 98 determines if the point is within regions I' and II'. Similarly, in FIG. 11 circuit 176 determines whether the operating point is within region I; 177 determines whether the point is within region III; 178 determines whether the point is within region II; and 179 determines whether the point is within region VII. A second determination is then made by the AND circuit. Circuit 99 indicates whether or not the point is within regions I, II, III, or VII; circuit 100 indicates whether or not the point is within regions I', II', VI', or VIII'; OR circuit 106 then determines whether both of these conditions are true, i.e., that the operating point lies within region I or II or III or VII and lies within region I', II', VI', or VIII'. If both conditions are satisfied, a safe indication is given. In FIG. 11 circuit 180 indicates whether or not the operating point lies within any one of the acceptable regions of operation I, II, III, or VII. If it does lie within one of these regions, a safe indication is given. It should be noted here that in the embodiment of FIG. 11 there are no overlapping regions, as is the case in the embodiment of FIG. 7, where the primed regions overlap one or more unprimed regions. In both cases, however, the regions are essentially superimposed to define an operating curve or a series of boundary conditions dividing the total operating region into two or more composite regions, one of which is acceptable. When any of the boundaries is crossed by the operating point, one or more of the indications resulting from the determination by the first OR circuit, e.g., 96, are changed. This change may or may not be an indication of a change in operating conditions from an acceptable region to an unacceptable region. Thus, for example, in FIG. 5 the boundaries defined by R and R' are not controlling in regions I, II', II, and II'. Similarly, in FIG. 10 the limit setting of $n$ is not controlling in region VII. It is apparent that certain of the limit settings are selected to define the points at which the various boundaries meet.

In both embodiments this determination results in an indication as to whether the operating point is within an acceptable or unacceptable region of operation for each of the one or more operating curves used. Further, in both embodiments each operating curve is made up of a plurality of boundaries defined by the limit values, and a determination is made as to the location of the operating point with respect to one or more operating curves. Thus, FIG. 5 utilizes eight boundaries to define four operating curves, which four curves separate the composite regions of safe, alarm, and scram operating conditions. FIG. 10 utilizes six boundaries to define three operating curves, which three curves separate the composite regions of safe, alarm, setback, and scram conditions ($n_h$ is not included here, since it is an independent condition herein). There may also be superimposed upon these curves, as in the case of FIG. 10 and the parameter $n_h$, an independent control parameter and limit setting which is always controlling regardless of the values of the other parameters, e.g., $W_T$ and $T_0$.

Therefore, it is apparent from the foregoing description that the present invention provides a method and apparatus for continuously determining an operating condition defined by a plurality of variable parameters, e.g., P and S, and/or W, $T_{in}$, and $n$, by comparing the value of each of the variable parameters with at least one predetermined limit setting, indicating whether or not one or more limit values have been reached, and then comparing these indications in preselected groups, as by AND and OR circuits, relays, or actual comparison, to determine whether the operating condition defined by the parameters lies within particular regions defined by the limit values. While the preferred embodiments have been described with reference to particular variable parameters of a sodium cooled power reactor system, i.e., flux, coolant flow, and temperature, it is apparent to those skilled in the art that additional variable parameters could be included in the system, such as pressure in pressurized reactor systems, or that the method and apparatus described herein may be used with any system whose operation is defined by a plurality of parameters. Further, the two described embodiments of the present invention may be used together as in a reactor system or separately, depending upon the number of variable parameters defining the operation condition to be monitored. The present invention is not limited to the specific details of the particular embodiments described, since many modifications will be apparent to those skilled in the art, the scope of the present invention being limited only by the appended claims.

What is claimed is:

1. A monitoring system comprising first means providing input signals representing values of pertinent parameters of a system to be monitored, said pertinent parameters defining an operating condition of said monitored system, second means coupled to said first means for comparing each of said pertinent parameter values with at least one preselected limit value and generating second signals indicating when each of said parameters has reached at least one of its respective limit values and indicating when each of said parameters has failed to reach at least one of its respective limit values, third signals indicating whether all said second signals of a predetermined group are within their respective limit values and generating a fourth signal when any one second signal of a predetermined group has exceeded its limit value, said preselected limit values defining at least one boundary curve defining a boundary between acceptable and unacceptable regions of operation of said monitored system, fourth means including at least one AND and one OR circuit for comparing said third and fourth signals from said third means and generating signals indicating whether or not the operation is within the acceptable region of at least one of said curves.

2. A monitoring system for a nuclear reactor system having a reactor core, at least one heat exchanger and a primary coolant flow comprising first means providing parameter signals representing values of pertinent parameters of said reactor system, said parameters including primary coolant flow rate, temperature of coolant entering said reactor and neutron flux of said reactor; second means responsive to said first means for generating a signal representing a predicted reactor outlet temperature parameter value; third means responsive to said first and second means to provide signals indicating whether or not said parameter values are individually within acceptable limits; fourth means responsive to said first, second, and third means for providing signals indicating whether or not said system is operating within predetermined boundary conditions defined by said limits.

3. A monitoring system for a heat exchanging system having a primary and a secondary coolant flow comprising first means providing input signals representing values of pertinent parameters of said heat exchanging system, said parameters including primary coolant flow rate and secondary coolant flow rate; second means responsive to said first means to provide signals indicating whether or not said parameter values including said primary and secondary coolant flow rate are individually within acceptable limits; third means responsive to said first means to provide signals indicating whether or not predetermined relationships between said parameter values are within acceptable limits, including means for generating a signal representing the ratio between said primary and said secondary flow rates, and indicating whether the value of said ratio is within acceptable predetermined limits; fourth means responsive to said second and third means for providing signals indicating whether or not said system is operating within predetermined boundary conditions defined by said limits.

4. A computer system comprising a plurality of variable input signals defining an operating condition; means responsive to each input signal for generating variable first voltage signals representing an operating point, said means including at least one means for generating a first signal representing the ratio between one of said input signals and at least one other input signal, each of said first signals having a predetermined range of values; means for generating a plurality of limit voltage signals, at least one of said limit signals for each first signal, each of said limit signals being within the predetermined range of its respective first signal and defining a portion of a boundary curve; voltage level detecting means connected to said first and second means for comparing each of said first voltage signals with at least one limit signal and generating at least one output signal in response to the value of said first signal reaching its respective limit signal value; and means including AND and OR circuits connected to said third-named means for comparing preselected groups of said output signals for determining where said point defined by said variable input signals is located with respect to said curve.

5. A computer system comprising a plurality of variable input signals defining an operating condition; first means responsive to said input signals for generating a plurality of variable first signals defining an operating point, said first means including means for generating one signal representing the sum of a portion of said input variables and means for generating another signal representing the ratio between said one signal and at least one of said input signals; second means for generating a plurality of limit signals, at least one of said limit signals for each first signal, said plurality of limit signals defining an operating curve boundary; third means, including a plurality of voltage level detecting means, connected to said first and second means for comparing each of said first signals with at least one limit signal and generating a second signal when said first signal is less than said limit value and a third signal in response to the value of said first signal reaching its respective limit value; and fourth means for comparing preselected groups of said second and third signals and generating an indicating signal, said indicating signal having a first value when all of said input signals have failed to reach said limit values and a second value when at least one preselected input signal has reached said operating curve boundary, and means responsive to said indicating signal for controlling at least one of said variable input signals.

6. A monitoring system comprising first means responsive to a plurality of input signals from a system to be monitored for providing a plurality of first signals representing pertinent parameters of said system and defining an operating condition of said system, second means for generating a plurality of sets of limit value signals, each of said sets defining a boundary curve, said plurality of boundary curves defining a plurality of areas of operation, third means responsive to said first means for comparing each of said first signals with one limit value signal in each of said plurality of sets of limit values and generating a third signal when said limit value has been exceeded and a fourth signal when said first signal is less than said limit value, logic means responsive to said third means for comparing said third and fourth signals in preselected groups and generating at least one signal representing the location of said operating condition with respect to at least one of said boundary curves, and means for indicating the relative location of said operating condition with respect to at least one of said curves.

7. A monitoring system comprising first means providing a plurality of parameter signals representing values of pertinent parameters of a system to be monitored and defining an operating condition of said monitored system, second means for generating a plurality of signals representing a first set of limit values, said first limit values defining a first operating curve, third means for generating a plurality of signals representing a second set of limiting values, said second limit values defining a second operating curve, fourth means connected to said first and second means for comparing each of said parameter signals with one of the limit values of said first set and generating first output signals indicating when said parameter signals have reached and have failed to reach said limit values of said first set, fifth means connected to said first and third means for comparing each of said parameter signals with one of the limit values of said second set and generating second output signals indicating when said parameter signals have reached and have failed to reach said limit values of said second set, sixth means responsive to said first output signals for generating an indicating signal defining the relative location of said operating condition with respect to said first operating curve, seventh means responsive to said fifth means for generating an indicating signal defining the relative location of said operating curve, and means responsive to said indicating signals of said sixth and seventh means for indicating the relative location of said operating condition with respect to both said first and second operating curves.

8. A monitoring system comprising first means for providing a plurality of first signals representing the values of pertinent parameters of a system to be monitored; second means responsive to said first means comparing each of said first signals with at least one preselected limit value for generating a plurality of second and third signals, each of said second signals being generated when an associated first signal is within said limit value, each of said third signals being generated when an associated first signal has reached said limit value; third means comparing preselected groups of said second and third signals for generating a plurality of fourth and fifth signals, each of said fourth signals being generated when a preselected group has a predetermined relationship, each of said fifth signals being generated when a preselected group has another predetermined relationship; and fourth means responsive to preselected groups of said fourth and fifth signals for indicating whether or not said monitored system is operating within acceptable boundary conditions, said boundary conditions being defined by said preselected limit values.

9. The monitoring system of claim 8 wherein said third means includes a plurality of OR circuits connected to said second means and responsive to preselected groups of said second and third signals for comparing said signals.

10. The monitoring system of claim 8 wherein said fourth means includes at least one AND circuit responsive to said fourth and fifth signals for comparing preselected groups of said fourth and fifth signals and generating an indicating signal when said group has a predetermined relationship.

11. A monitoring system comprising a plurality of pertinent parameter signals representing the operating condition of a system to be monitored; first means responsive to said parameter signals for generating first voltage signals representing an operating point, said first means including at least one means for combining at least two of said parameter signals in a predetermined relation and generating a first voltage signal representing said relation; second means for comparing each of said first signals with at least one preselected limit value and for generating a plurality of second and third signals, each of said second signals being generated when an associated first signal is within said limit value, each of said third signals being generated when an associated first signal has reached said limit value; logic means comparing preselected groups of said second and third signals for generating a plurality of fourth and fifth signals, each of said fourth signals being generated when a preselected group has a predetermined relationship, each of said fifth signals being generated when a preselected group has another relationship; and fourth means responsive to preselected groups of said fourth and fifth signals for indicating whether or not said monitored system is operating within the boundary conditions defined by said preselected limit values.

12. A computer comprising a plurality of first means for generating a plurality of variable first voltage signals representing pertinent parameters defining a point; a plurality of trigger means each including a voltage level detecting means, each trigger means being responsive to one of said first signals for comparing said first signal with a preselected voltage level of said detecting means and for generating a second signal when said voltage level has been reached and a third signal when said voltage level has not been reached, said plurality of trigger means generating a plurality of said second and third signals, said preselected voltage levels defining at least one boundary curve, a plurality of logic means each responsive to a preselected group of said second and third signals for generating fourth signals when said preselected group has a predetermined relationship, said plurality of logic means generating a plurality of fourth signals, and fourth means responsive to a plurality of said fourth signals for indicating the relative position of said point with respect to at least one boundary curve.

References Cited by the Examiner

UNITED STATES PATENTS

| | | | |
|---|---|---|---|
| 2,725,549 | 11/55 | Dunnet | 340—172 |
| 2,779,728 | 1/57 | Zinn et al. | 204—193.3 |
| 2,783,453 | 2/57 | Rose | 340—213 X |
| 2,883,651 | 4/59 | Aukerlund | 340-213 |
| 2,901,739 | 8/59 | Freitas | 340—149 X |
| 2,927,070 | 3/60 | DeShong | 204—193.3 |
| 2,931,761 | 4/60 | Hurwitz | 204—193.3 |
| 2,931,763 | 4/60 | Dever | 204—193.3 |
| 2,971,089 | 2/61 | Haywood | 250—44 X |
| 2,978,177 | 4/61 | Newell et al. | 235—193 |
| 3,009,062 | 11/61 | Brooksbank et al. | 250—43.5 X |
| 3,030,614 | 4/62 | Lehan et al. | 340—347 |
| 3,042,595 | 7/62 | Cobb et al. | 204—193.3 X |
| 3,045,221 | 7/62 | Roop | 340—213 |
| 3,147,370 | 9/64 | Lowman | 235—151 |

OTHER REFERENCES

Pages 2–77, 1957, Landee et al. Electronic Designers' Handbook, McGraw-Hill.

MALCOLM A. MORRISON, *Primary Examiner*.